United States Patent [19]

Pintauro et al.

[11] Patent Number: 5,387,378
[45] Date of Patent: Feb. 7, 1995

[54] INTEGRAL ASYMMETRIC FLUOROPOLYMER PERVAPORATION MEMBRANES AND METHOD OF MAKING THE SAME

[75] Inventors: Peter N. Pintauro; Kangzhuang Jian, both of New Orleans, La.

[73] Assignee: Tulane University, New Orleans, La.

[21] Appl. No.: 51,050

[22] Filed: Apr. 21, 1993

[51] Int. Cl.$^6$ .................... B29C 65/00; B05D 5/00
[52] U.S. Cl. .......................... 264/48; 264/41; 264/49; 427/244; 427/245; 427/246
[58] Field of Search .................. 427/244, 245, 246; 264/41, 48, 49

[56] References Cited

U.S. PATENT DOCUMENTS

| | | |
|---|---|---|
| 3,133,132 | 5/1964 | Leob et al. |
| 3,483,282 | 12/1969 | Manjikian |
| 3,615,024 | 10/1971 | Michals ........................ 210/490 |
| 4,203,847 | 5/1980 | Grandine |
| 4,232,087 | 11/1980 | Trask ............................ 427/244 |
| 4,307,135 | 12/1981 | Fox .............................. 427/244 |
| 4,376,140 | 3/1983 | Kimoto et al. ................ 427/244 |
| 4,414,280 | 11/1983 | Silva et al. .................... 427/245 |
| 4,557,955 | 12/1985 | Walch et al. .................. 427/244 |
| 4,613,544 | 9/1986 | Burleigh ....................... 427/245 |
| 4,784,880 | 11/1988 | Coplan et al. ................. 427/245 |
| 5,171,611 | 12/1992 | Porter et al. .................. 427/246 |
| 5,190,654 | 3/1993 | Bauer ........................... 427/246 |
| 5,238,471 | 8/1993 | Blanchet-Fincher ........... 427/245 |

FOREIGN PATENT DOCUMENTS

| | | | |
|---|---|---|---|
| 0245863 | 5/1987 | European Pat. Off. | |
| 54-135674 | 10/1979 | Japan ............................ | 427/244 |
| 58-91733 | 5/1983 | Japan ............................ | 427/245 |

OTHER PUBLICATIONS

F. P. McCandless, *Ind. Eng. Chem. Process Des. Develop.*, 12(3):354–359 (1973).

(List continued on next page.)

*Primary Examiner*—Joseph L. Schofer
*Assistant Examiner*—N. Sarofin
*Attorney, Agent, or Firm*—Needle & Rosenberg

[57] ABSTRACT

The present invention provides a method for fabricating an asymmetric fluoropolymer membrane comprised of a fluoropolymer material, the membrane having a first surface comprised of a dense layer of the fluoropolymer material, and an opposite second surface comprised of a porous layer of the fluoropolymer material, comprising the steps of:

(a) dissolving a fluoropolymer material in a solvent to form a solution;

(b) depositing the solution on a casting surface; and (c) removing the solvent from the solution, thereby precipitating the membrane therefrom.

The present invention also provides asymmetric fluoropolymer membranes comprised of a fluoropolymer material, wherein the membrane has a first surface comprised of a dense layer of the fluoropolymer material, and an opposite second surface comprised of a porous layer of the fluoropolymer material, and provides compositions for making the same.

The present invention further provides a method for separating one or more organic compounds from a mixture of organic compounds or one or more organic compounds from water by pervaporation or vapor permeation, comprising the steps of:

(a) placing an asymmetric fluoropolymer membrane comprised of a fluoropolymer material into a suitable pervaporation or vapor permeation apparatus such that the membrane forms a selectively permeable barrier to one or more compounds of the mixture, the membrane having a first surface comprised of a dense layer of the fluoropolymer material, and an opposite second surface comprised of a porous layer of the fluoropolymer material;

(b) contacting the first surface of the membrane with the mixture; and (c) transporting permeate through the membrane by creating a difference in the partial pressure of the compounds between the first and second surfaces of the membrane.

28 Claims, No Drawings

U.S. PATENT DOCUMENTS

H. Eustache et al., *Journal of Membrane Science*, 8:105–114 (1981).

Joseph D. Grandine, Ger. Offen. 2,822,265, *Chemical Abstracts*, 90:88427m, (1979).

P. Aptel et al., *Journal of Membrane Science*, 85:167417h (1973).

R. Bakish, *Proceedings of Second International Conference on Pervaporation Processes in the Chemical Industry*, San Antonio, Tex., pp. 58–175, (Mar. 8–11, 1987).

Trong G. Nguyen et al., *Journal of Membrane Science*, 30:11–22 (1987).

J. P. Brun et al., *Journal of Membrane Science*, 25:55–100 (1985).

Robert Y. M. Huang, *Membrane Science and Technology Series, 1,* Elsevier Science Publishers B.V., Amsterdam, The Netherlands, pp. 18–275 (1991).

J. G. Wijmans et al., *Environmental Progress*, 9(4):262–268 (Nov. 1990).

E. Anthony Allegrezza et al., *Chemical Abstracts*, 108:133028k.

R. W. Baker et al., *Membrane Separation Systems*, Noyes Data Corporation, Park Ridge, N.J., pp. 100–188 (1991).

N. H. Nijhuis et al., University of Twente, Department of Chemical Technology, The Netherlands, *Proceedings of the Third Conference on Pervaporation Processes in the Chemical Industry*, (edited by R. Bakish, pub. Bakish Materials Corp., Inglewood, N.J.), pp. 239–251 (1988).

G. Bengtson et al. GKSS Forschungszentrum, W. Germany, *Proceedings of the Third Conference on Pervaporation Processes in the Chemical Industry*, (edited by R. Bakish, pub. Bakish Materials Corp., Inglewood, N.J.), pp. 439–448 (1988).

INTEGRAL ASYMMETRIC FLUOROPOLYMER PERVAPORATION MEMBRANES AND METHOD OF MAKING THE SAME

This invention was made with government support under Grant No. DOD 2-PO89-116,881150 awarded by the United States Department of Defense. The government has certain rights in the invention.

BACKGROUND OF THE INVENTION

1. Field of the Invention

This invention relates to compositions and methods for fabricating asymmetric fluoropolymer membranes comprised of fluoropolymer materials. This invention also relates to a method for separating one or more organic compounds from a mixture of organic compounds or one or more organic compounds from water by pervaporation or vapor permeation utilizing asymmetric fluoropolymer membranes of the present invention.

2. Background of the Invention

Pervaporation and vapor permeation are membrane processes used to separate mixtures of dissolved organic solvents and are extremely important in many industrial applications, e.g., the removal of organic pollutants from waste water. In the pervaporation process, a liquid mixture feed solution contacts the upstream side of a pervaporation (PV) membrane and the permeate is removed as a vapor on the downstream side. Transport through the membrane is achieved by the difference in partial pressure between the liquid feed solution and permeate vapor. Solvent/solute separation is achieved due to the difference in relative volatilities and membrane permeabilities of the feed solution compounds. The efficiency of a membrane pervaporation process is measured by its Flux and Separation Factor. Flux is a measure of the weight of solute which passes through the membrane per the membrane area per a unit of time. Separation Factor is the concentration ratio of solute to solvent in the permeate divided by the concentration ratio of solute to solvent in the feed solution.

The key element in a pervaporation separation process is the membrane itself. The critical physical and operational characteristics of a pervaporation membrane are that it exhibit:

1. high separation factor (high solute selectivity);
2. high solute flux;
3. chemical stability to a wide range of organic solutes and solvents;
4. mechanical stability; and
5. thermal stability.

The method for fabricating the membranes should provide an easy means for altering the membrane microstructure, thereby changing membrane permeability and selectivity. Prior to this invention, however, attempts to fabricate a pervaporation membrane which exhibits all of these critical characteristics have been largely unsuccessful.

Many studies have been performed on the use of pervaporation membrane processes to separate azeotropic mixtures, e.g. alcohol and water (P. Aptel, N. Challard, J. Cuny, and J. Neel, Journal of Membrane Science, 1:271 (1976)) to dehydrate organic liquids (W. H. Schneider, "Purification of Anhydrous Organic Mixtures by Pervaporation," in Proceedings of the Second International Conference on Pervaporation Processes in the Chemical Industry, R. Bakish, ed., pp. 169–175, (1987)), and to remove organics from groundwaters and industrial wastewaters (H. Eustache and G. Histi, Journal of Membrane Science, 8:105 (1981)); (T. Q. Nguyen and K. Nobe, Journal of Membrane Science, 30:11 (1987)); (J. P. Brun, C. Larchet, G. Bulvestre, and B. Auclair, Journal of Membrane Science, 25:55 (1985)). Much of the prior work on the separation of organics from water has focused on the use of PV membranes composed of elastomeric (rubbery) polymers. The most widely used elastomeric membrane materials are silicone rubber (polydimethylsiloxane) and copolymers thereof, followed by copolymers of styrene and styrene derivatives (R. Y. M. Huang, Ed., Pervaporation Membrane Separation Processes, Elsevier, pp 439 (1991)). Other membrane materials include soft segment elastomers such as polyether block amides (G. Bengtson and K. W. Böddeker, "Pervaporation of Low Volatiles from Water," in Proc. 3rd Int. Conference on Pervaporation Processes in the Chemical Industry, R. Bakish, ed., Englewood, N.J., pp. 439–448 (1987)), nitrile butadiene and styrene-butadiene rubbers (Brun et al. 1985)) and low density polyethylene (Eustache et al. (1981)). These membrane materials exhibit relatively high selectivity for removing different organic components like chloroform, benzene, toluene, ethanol, and acetone from dilute aqueous feed solutions. However, the organic fluxes are often low due to the fact that the membranes are thick and have a homogeneous (symmetric) microstructure. Likewise, these membranes are not very resistant to chemical and thermal degradation.

In an effort to improve organic transport rates, composite membranes were developed, wherein a thin permselective polymer top layer is coated on a sublayer which is microporous and offers little or no resistance against the permeating organic species. The top layer is usually composed of a different polymer material than the support layer. Examples of composite-coated PV membranes are the Code-100 and Code-200 silicone rubber membranes manufactured by Membrane Technology and Research, Inc. of Menlo Park, Calif. (J. G. Wijmans, J. Kaschemekat, J. E. Davidson, and R. W. Baker, "Treatment of Organic-Contaminated Wastewater Streams by Pervaporation," Environmental Progress, 9:262 (1990)). These membranes, however, require complex fabrication procedures and lack the desired resistance to chemical and thermal degradation. Therefore, there exists a need to develop a better pervaporation membrane with higher flux and separation factor than is seen with previous pervaporation membranes. There also exists a need for a pervaporation membrane fabricated from more stable polymers, i.e., a PV membrane more resistant to chemical and thermal degradation.

As an alternative to homogeneous and composite-coated PV membranes, the one component asymmetric membrane has been tried for pervaporation separation. Such membranes are prepared by a phase inversion technique where a homogeneous polymer solution is cast as a thin film or spun as a hollow fiber and immersed in a non-solvent bath. Dense and microporous layers are formed from the single polymer by a combination of demixing of the casting solution, solvent removal, and precipitation of the polymer. A classic and well-known example of a commercially available phase-inversion membrane is the asymmetric cellulose acetate reverse-osmosis membrane (U.S. Pat. No. 3,133,132 (1964)). These membranes, however, proved to be ineffective in separating water/organic liquids in a pervaporation process (Huang et al. (1991). To date, researchers have been unsuccessful in fabricating new phase-inversion membranes for pervaporation separations.

Prior work on fluoropolymer pervaporation membranes has been quite limited. In 1972 McCandless reported on the use of polyvinylidene fluoride (PVDF) resin membranes which were plasticized with 3-methylsulfolene (F. P. McCandless, Ind. Eng. Chem. Process Des. Develop., 12:354 (1973)). These membranes were able to separate a variety of aromatic/naphthene organic mixtures (e.g., benzene/cyclohexane) but the aromatic separation factors were low (2.29–5.45). More recently, Belfort and co-workers used symmetric polyvinylidene fluoride PV membranes to separate ethanol and chloroform from water. For ethanol/water separation the performance of these PVDF membranes was comparable to silicone membranes (Y. M. Lee, D. Bourgeois, and G. Belfort, "Selective Organic Transport Through Polyvinylidene Fluoride (PVDF) for Pervaporation," in Proceedings of the Second International Conference on Pervaporation Processes in the Chemical Industry, R. Bakish, ed., pp. 58–70 (1987)). For chloroform separation, however, large permeation fluxes with separation factors significantly lower than silicone characterized these PVDF membranes. Consequently, there still exists a need to provide a stable efficient and effective membrane for pervaporation separation.

The present invention satisfies that need by providing a composition and a method for fabricating an asymmetric pervaporation membrane comprised of a fluorinated polymeric material which exhibits improved performance over prior art membranes. The method for fabricating the membrane is unique and it is this method which imparts the asymmetric structure to the membrane. This method also provides an easy means for altering the membrane microstructure thereby changing membrane permeability and selectivity.

The membranes of the present invention posses separation and flux characteristics which make them highly suitable for use in organic/water and organic/organic pervaporation or vapor permeation separations, e.g., the removal of nonpolar organic pollutants from :wastewater (the removal of benzene, toluene, and chloroform from water), the separation of water soluble organics from water (e.g. dioxane, acetone, alcohols, and ethyl acetate), and the separation of mixtures of two or more organic components. The membranes are composed of a hydrophobic fluorinated hydrocarbon polymer which is highly inert to chemical attack by solvent or solute species. The membranes of the present invention can also be used at higher temperatures than traditional PV films such as silicone rubber membranes which have a temperature limit of approximately 60° C., depending upon the extent of cross-linking.

The present invention also satisfies many industrial needs for an efficient and effective pervaporation process by providing a method for separation one or more organic compounds dissolved in a solvent of a liquid feed solution by pervaporation or vapor permeation utilizing the asymmetric fluoropolymer membranes of the invention.

SUMMARY OF THE INVENTION

The present invention provides a method for fabricating an asymmetric fluoropolymer membrane comprised of a fluoropolymer material, the membrane having a first surface comprised of a dense layer of the fluoropolymer material, and an opposite second surface comprised of a porous layer of the fluoropolymer material, comprising the steps of:

(a) dissolving a fluoropolymer material in a solvent to form a solution;

(b) depositing the solution on a casting surface; and (c) removing the solvent from the solution, thereby precipitating the membrane therefrom. Any fluoropolymer material or fluorinated copolymer can be utilized in the method, including but not limited to, material selected from the group consisting of polyvinylidene fluoride, polytetrafluoroethylene, polyhexafluoropropylene, and polyvinylchlorotrifluoroethylene.

The present invention also provides a method for separating one or more organic compounds from a mixture of organic compounds or one or more organic compounds from water by pervaporation or vapor permeation, comprising the steps of:

(a) placing an asymmetric fluoropolymer membrane comprised of a fluoropolymer material into a suitable pervaporation or vapor permeation apparatus such that the membrane forms a selectively permeable barrier to one or more compounds of the mixture, the membrane having a first surface comprised of a dense layer of the fluoropolymer material, and an opposite second surface comprised of a porous layer of the fluoropolymer material;

(b) contacting the first surface of the membrane with the mixture; and (c) transporting permeate through the membrane by creating a difference in the partial pressure of the compounds between the first and second surfaces of the membrane.

Also provided by the present the invention are compositions for fabricating asymmetric fluoropolymer membranes which can be utilized in the method to produce an asymmetric fluoropolymer membrane. Specifically, the present invention provides a composition for fabricating an asymmetric fluoropolymer membrane, comprising between about 10–16 wt % polyvinylidene fluoride, between about 65–75 wt % acetone and between about 10–25 wt % of a high boiling point solvent selected from the group consisting of dimethylformamide, dimethylacetamide, dimethylsulfoxide or mixtures thereof. Additionally, the present invention provides composition for fabricating an asymmetric fluoropolymer membrane, comprising between about 10–16 wt % polyvinylidene fluoride/polyhexafluoropropylene copolymer, between about 60–80 wt % acetone and about 10–25 wt % of a high boiling point solvent selected from the group consisting of dimethylformamide, dimethylacetamide dimethylsulfoxide or mixtures thereof. The present invention further provides a composition for fabricating an asymmetric fluoropolymer membrane, comprising between about 8–12 wt % polyvinylidene fluoride, between about 2–6 wt % polyvinylidene fluoride/polyvinylchlorotrifluoroethylene copolymer, between about 65–75 wt % acetone, and between about 10–25 wt % of a high boiling point solvent selected from the group consisting of dimethylformamide, dimethylacetamide, dimethylsulfoxide or mixtures thereof.

The present invention also provides an asymmetric fluoropolymer membrane comprised of a fluoropolymer material, wherein the membrane has a first surface comprised of a dense layer of the fluoropolymer material, and an opposite second surface comprised of a porous layer of the fluoropolymer material. Specifically, the present invention provides an asymmetric fluoropolymer membrane comprised of a fluoropolymer material, wherein the fluoropolymer material is selected from the group consisting of a fluoropolymer, a fluorinated copolymer, or mixtures thereof. The membranes of the present invention can be selected from the group consisting of polyvinylidene fluoride, polytetrafluoroethylene, polyhexafluoropropylene, and polyvinylchlorotrifluoroethylene or mixtures thereof.

One embodiment of the present invention provides an asymmetric fluoropolymer membrane comprised of a fluoropolymer material, wherein the fluoropolymer is polyvinylidene fluoride. Another embodiment of the present invention provides an asymmetric fluoropolymer membrane comprised of a fluorinated copolymer, wherein the fluorinated copolymer is comprised of polyvinylidene fluoride and polytetrafluoroethylene. Additionally, present invention provides an asymmetric fluoropolymer membrane comprised of a fluorinated copolymer, wherein the fluorinated copolymer is comprised of polyvinylidene fluoride and polyhexafluoropropylene. Finally, the present invention provides an asymmetric fluoropolymer membrane comprised of a fluorinated copolymer, wherein the fluorinated copolymer is comprised of polyvinylidene fluoride and polyvinylchlorotrifluoroethylene.

DETAILED DESCRIPTION OF THE ILLUSTRATIVE EMBODIMENT

The present invention may be understood more readily by reference to the following detailed description of specific embodiments and the examples included therein.

The present invention provides a method for fabricating an asymmetric fluoropolymer membrane comprised of a fluoropolymer material, the membrane having a first surface comprised of a dense layer of the fluoropolymer material, and an opposite second surface comprised of a porous layer of the fluoropolymer material, comprising the steps of:

(a) dissolving a fluoropolymer material in a solvent to form a solution;
(b) depositing the solution on a casting surface; and
(c) removing the solvent from the solution, thereby precipitating the membrane therefrom.

As used herein, fabrication refers to the process of making the membrane and may be used interchangeably with casting. The term "dense" means of low porosity or wherein the pores are usually visible by scanning electron microscopy at a magnification factor of about 1000–1500×. At these magnification factors, the asymmetric nature of the membranes of the present invention (dense and microporous regions) are clearly discernable. The term "depositing" is meant to include any method for contacting the fluoropolymer solution with the casting surface, including but not limited to, spreading the solution with a casting knife, or feeding the solution into a spinneret nozzle such that the solution is deposited on the surfaces of the nozzle.

The asymmetric structure of the fluoropolymer membranes of the present invention can be fabricated in a standard casting process, e.g., by plate casting as described in the examples included herein. This casting process produces a membrane with an asymmetric microstructure from a single film of fluoropolymer and solvent deposited on the casting surface. Membranes produced by the methods described herein are to be differentiated from composite membranes in which the asymmetric structure is achieved by layering components, e.g., the Code 100 and Code 200 membranes produced by Membrane Technology Research Incorporated and described by Wijmans et al. (1990).

Alternatively, the asymmetric fluoropolymer membranes can be fabricated as hollow fiber or capillary membranes. One skilled in the art can appreciate that the fluoropolymers, solvents and other materials used for casting the thin film asymmetric fluoropolymer membranes including the compositions described herein can be utilized to produce asymmetric hollow fiber or capillary fluoropolymer membranes. Briefly, such membranes can be produced by dissolving a fluoropolymer material in a solvent thereby forming a solution of fluoropolymer material and solvent utilizing the methods taught herein; depositing the solution into the outer bore of a double bore spinneret nozzle; extruding the solution from the nozzle; and removing the solvent from the solution, thereby precipitating the membrane therefrom, see, e.g., Mark C. Porter, "Handbook of Industrial Membrane Technology", Noyes Publications (1990).

The present invention also provides a method of producing an asymmetric fluoropolymer membrane wherein the first surface of the membrane precipitates at the interface of the casting surface and the solution. This method is to be distinguished from that of Loeb and Sourirajan (U.S. Pat. No. 3,133,132 (1964) in which the a porus layer of cellulose acetate forms at the interface of the casting surface and the solution.

The method of the present invention can further comprise the step of heating the solution at a temperature of between about 45°–60° C. for between about 30–60 minutes prior to applying the solution to the casting surface. During the heating step, the polymer/solvent solution is heated to a temperature of between about 45°–60° C. for between about 30–60 minutes or until the solution turns from cloudy to less cloudy or almost clear. As one skilled in the art can appreciate, the temperature and length of time the polymer/solvent solution is heated will vary depending upon the selection of polymer and/or solvent.

The present invention provides a method for fabricating an asymmetric fluoropolymer membrane wherein the removing step comprises evaporating the solvent from the solution by air drying the solution. The present invention also provides a method for fabricating an asymmetric fluoropolymer membrane wherein the removing step further comprises the steps of:

(a) evaporating the solvent by air drying the solution for a sufficient period of time until the surface of the solution at the air interface has gelled.; and
(b) immersing the solution in a precipitation bath.

The term "gelled" means that the solution has hardened to a semi-hardened state, i.e., the fluoropolymer solution at the air interface begins to solidify. As used herein, a precipitation bath means a container filled with a suitable liquid, the container being large enough to submerse the casting surface containing the polymer/solvent solution or the polymer/solvent extruded from a spinneret in the liquid. It should be appreciated by one skilled in the art that any of a number of commercially available precipitation baths can be utilized in the methods described herein.

By suitable liquid is meant any liquid which further aids in precipitation of the asymmetric fluoropolymer membrane structure from the polymer/solvent solution wherein the liquid can comprise a single liquid or a mixture of liquids. The combination of liquids in the precipitation bath allows solvent from the polymer/solvent solution to move out into the bath liquid, thereby aiding in precipitation of the membrane. In several of the examples contained herein, a two-way transport may occur between the polymer/solvent solution and the liquid in the precipitation bath, i.e., solvent leaves the precipitating membrane and components of the liquid in the bath enter the polymer solution. This two-way transport may help impart the asymmetric structure to the membrane. It should be appreciated by one skilled in the art that by varying the relative concentrations of liquids in the baths, one can vary the structure of the membrane.

In one embodiment of the present invention, the precipitation bath for a wet cast asymmetric PVDF membrane comprises three precipitation baths: a first precipitation bath comprising about 50–60 vol % water, about 35–45 vol % acetone, and about 5–15 vol % dimethylformamide, dimethylsulfoxide or dimethylacetamide; a second precipitation bath comprising about 55–75 vol % water and about 45–25 vol % acetone; and a third precipitation bath comprising water. In another embodiment the invention utilizes two baths: a first precipitation bath comprising about 25 vol % acetone and about 75 vol % water and a second precipitation bath consisting of water and wherein the immersing step comprises placing the solution successively in the first and second baths. For example, the first precipitation bath for the polyvinylidene fluoride/polyhexafluoropropylene membrane can comprise between about 10–40 vol % acetone and between about 60–90 vol % of water. Generally, the temperature of the precipitation baths can range from about 0°–25° C., but preferably about 15° C. It should be appreciated by one skilled in the art that by varying the relative concentrations of liquids in the baths, one can vary the structure of the membrane.

The method for fabricating an asymmetric fluoropolymer membrane of the present invention can further comprise, prior to the removing step of wet membrane casting, the step of controlling air temperature and humidity wherein the air temperature is between about 20°–45° C. and the humidity is between about 45–85%. During the removing step of wet membrane casting, the time of air drying the solution can vary between about 1–30 minutes depending upon the choice of fluoropolymer, and upon the desired microstructure of the membrane. For dry membrane casting, the air drying time is greater than about 30 minutes and can be as long as 3 hours.

The solvent utilized in the method for fabricating an asymmetric fluoropolymer membrane, as taught herein, can further comprise a mixture of a low boiling point solvent and a high boiling point solvent. In a presently preferred embodiment, the mixture of solvents comprises between about 75–90 vol % acetone and between about 10–25 vol % of a high boiling point solvent selected from the group consisting of dimethylacetamide, dimethylformamide, dimethylsulfoxide or mixtures thereof.

The phrase "low boiling point solvent" means a solvent which boils at a low temperature, i.e., below about 70° C. and especially below about 60° C. In a preferred embodiment of the present invention, acetone, (which boils at about 56° C.) is the low boiling point solvent. A preferred boiling range for the low boiling point solvent is between about 40°–60° C. By high boiling point solvent is meant a solvent which boils at a high temperature, i.e., above about 140° C. and especially above about 150° C. The boiling point range for the high boiling point solvent is preferably between about 140°–200° C., but this range is not intended to limit the invention to only solvents within that range. Suitable high boiling point solvents include, but are not limited to, dimethylacetamide, dimethylformamide, dimethylsulfoxide (DMSO) or mixtures thereof. Suitable high boiling point solvents must be able to mix well with the low boiling solvent such that the mixture is capable of dissolving the fluoropolymer or a fluorinated copolymer. The high boiling point solvent should also have a strong affinity for water. By strong affinity for water is meant that the solvent strongly hydrogen bonds with water. An indication of strong hydrogen bonding is a temperature rise of between about 0°–10° C. that is observed when a small amount of solvent is added to water, e.g., 10 ml of solvent is added to 100 ml of water.

The asymmetric fluoropolymer membranes of the present invention can be fabricated on a casting surface which includes any suitable inert support surface. By "suitable inert support surface" is meant a casting surface: a) that does not interact chemically or physically with the polymer/solvent solution; b) that can be removed from the surface of the membrane after fabrication is complete; or c) which can be incorporated into the membrane structure, e.g., a mechanical backing, without altering the function of the polymer layer or the performance of the membrane. One skilled in the art can appreciate that the casting surface can be selected from the group which includes, but is not limited to, glass, metal, plastic, paper, or non-woven fabric and is meant to include spinnerets, and the like.

The method for fabricating asymmetric fluoropolymer membranes is meant to include any fluoropolymer material. A "fluoropolymer" is defined as a polymeric material where the repeating unit of the carbon chain contains at least one fluoride atom. In principle, the polymer can be crosslinked and may contain charged moieties (e.g., $SO_3^-$ or $COO^-$) which are fixed to the polymer chain. In one embodiment of the present invention, the fluoropolymer material is selected from the group consisting of a fluoropolymer, a fluorinated copolymer, or mixtures thereof. In particular, the fluoropolymer material can be selected from the group, including but not limited to, polyvinylidene fluoride, polytetrafluoroethylene, polyhexafluoropropylene, and polyvinylchlorotrifluoroethylene.

The ratios of copolymer components in one embodiment of the present invention are in a ratio of about 50:50, e.g., about 50% polyvinylidene fluoride to about 50% polytetrafluoroethylene. It can be appreciated by one skilled in the art, however, that other ratios of the components of the copolymer can be utilized to produce the asymmetric fluoropolymer membranes and compositions of the present invention. Polyvinylidene fluoride can comprise from between about 100% down to about 7.5% of the composition of the copolymer.

The present invention also provides a composition comprising fluoropolymer and solvent which can be utilized in methods taught herein or in other methods to produce fluoropolymer membranes. Further, one skilled in the art can appreciate that any of the commonly used techniques for dissolving polymers in solvents can be utilized to make the compositions, including but not limited to, stirring, mixing, adding a heating step, degassing, or the like.

Specifically, the present invention provides a composition for fabricating an asymmetric fluoropolymer membrane, comprising between about 10-16 wt % polyvinylidene fluoride, between about 65-75 wt % acetone and between about 10-25 wt % of a high boiling point solvent selected from the group consisting of dimethylformamide, dimethylacetamide, dimethylsulfoxide or mixtures thereof. In a presently preferred embodiment of the invention, the composition comprises preferably about 14 wt % polyvinylidene fluoride, about 73 wt % acetone and about 13 wt % of the high boiling point solvent.

The present invention also provides a composition for fabricating an asymmetric fluoropolymer membrane, comprising between about 10-16 wt % polyvinylidene fluoride/polyhexafluoropropylene copolymer, between about 60-80 wt % acetone and about 10-25 wt % of a high boiling point solvent selected from the group consisting of dimethylformamide, dimethylacetamide dimethylsulfoxide or mixtures thereof. In a presently preferred embodiment the invention provides a composition comprising preferably about 12 wt % polyvinylidene fluoride/polyhexafluoropropylene copolymer, about 76 wt % acetone and about 12 wt % of the high boiling point solvent.

The present inventions further provides a composition for fabricating an asymmetric fluoropolymer membrane, comprising between about 8-12 wt % polyvinylidene fluoride, between about 2-6 wt % polyvinylidene fluoride/polyvinylchlorotrifluoroethyene copolymer, between about 65-75 wt % acetone, and between about 10-25 wt % of a high boiling point solvent selected from the group consisting of dimethylformamide, dimethylacetamide, dimethylsulfoxide or mixtures thereof. A presently preferred embodiment of the invention provides a composition comprising about 9.8 wt % polyvinylidene fluoride, about 4.2 wt % polyvinylidene fluoride/polyvinylchlorotrifluoroethylene copolymer about 73 wt % acetone, and about 13 wt % of the high boiling point solvent.

The compositions of the present invention can be deposited directly onto the casting surface. Alternatively, the casting surface can be wetted prior to casting with a wetting solution consisting of about 85 % of a high boiling point solvent and about 15% water.

In addition to the methods and compositions described above, the present invention provides an asymmetric fluoropolymer membrane comprised of a fluoropolymer material, wherein the membrane has a first surface comprised of a dense layer of the fluoropolymer material, and an opposite second surface comprised of a porous layer of the fluoropolymer material. The asymmetric structure of the membranes is produced from a single fluoropolymer/solvent solution and are to be distinguished from composite membranes, e.g., the Code 100 and Code 200 membranes described herein.

The fluoropolymer material for the membranes of the present invention can be any fluoropolymer or fluorinated copolymer, including but not limited to, polyvinylidene fluoride, polytetrafluoroethylene, polyhexafluoropropylene, and polyvinylchlorotrifluoroethylene or mixtures thereof. Specifically, the present invention provides an asymmetric fluoropolymer membrane comprised of polyvinylidene fluoride. The invention also provides an asymmetric fluoropolymer membrane comprised of polyvinylidene fluoride and polytetrafluoroethylene. Further, the present invention provides an asymmetric fluoropolymer membrane comprised of polyvinylidene fluoride and polyhexafluoropropylene. An alternate embodiment of the present invention provides an asymmetric fluoropolymer membrane comprised of polyvinylidene fluoride and polyvinylchlorotrifluoroethylene.

The membranes descried herein possess separation and flux characteristics which make them highly suitable for use in organic/water and organic/organic pervaporation or vapor permeation separations, e.g., the removal of nonpolar organic pollutants from wastewater, the separation of water soluble organics from water, and the separation of mixtures of two or more organic components. Accordingly, the present invention provides a method for separating one or more organic compounds from a mixture of organic compounds or one or more organic compounds from water by pervaporation or vapor permeation, comprising the steps of:

(a) placing an asymmetric fluoropolymer membrane comprised of a fluoropolymer material into a suitable pervaporation or vapor permeation apparatus such that the membrane forms a selectively permeable barrier to one or more compounds of the mixture, the membrane having a first surface comprised of a dense layer of the fluoropolymer material, and an opposite second surface comprised of a porous layer of the fluoropolymer material;

(b) contacting the first surface of the membrane with the mixture; and (c) transporting permeate through the membrane by creating a difference in the partial pressure of the compounds between the first and second surfaces of the membrane.

In the examples described herein, a standard flat sheet membrane apparatus was used to collect separation and flux data. Briefly, the equipment consisted of: a constant temperature circulation bath which pumped the feed solution to the upstream side of the asymmetric fluoropolymer pervaporation membranes; two stainless steel membrane cells which held the flat sheet membranes such that a total membrane surface area of 225 $cm^2$ was exposed to the feed solution; a series of liquid nitrogen cold traps to condense the permeate vapor; and a vacuum pump to reduce the partial pressure of the permeate species on the downstream side of the membrane. A series of thermocouples was placed upstream and downstream of the membrane in the feed and permeate lines to monitor the temperature. Pressure transducers were also placed in the permeate line to measure downstream pressure.

One skilled in the art will also appreciate that the methods and membranes of the present invention can be utilized in commercially available pervaporation or vapor permeation modules, e.g., a spiral wound pervaporation or vapor permeation apparatus such as the spiral wound modules of Membrane Technology and Research Inc. (see, Proc. 3rd Int. Conference on Pervaporation Processes in the Chemical Industry, R. Bakish, ed., Englewood, N.J., (1987)).

The methods of pervaporation or vapor permeation described herein can utilize asymmetric fluoropolymer membranes fabricated from any fluoropolymer or fluorinated copolymer, including but not limited to, polyvinylidene fluoride, polytetrafluoroethylene, polyhexafluoropropylene, and polyvinylchlorotrifluoroethylene or mixtures thereof. In particular, the method can be performed utilizing any of the asymmetric fluoropolymer membranes described herein.

The pervaporation and vapor permeation methods of the present invention can be utilized to separate organic compounds selected from the group which includes, but is not limited to, chlorinated hydrocarbon, aromatic hydrocarbon, alcohol, ketone, straight chain aliphatic hydrocarbon, cyclic aliphatic hydrocarbon, ethyl acetate, and dioxane. In particular, the method of the present invention can be used to separate benzene, toluene, chloroform, n-butanol and cyclohexane from other organic compounds or from water.

EXAMPLES

The general requirements of the flat sheet casting procedure of the present invention are described below. First a fluoropolymer powder is dissolved in a suitable mixed solvent consisting of one volatile (low boiling point) solvent and one or more high boiling point liquids. The polymer can be any single fluoropolymer, copolymer or mixtures thereof which can be dissolved in the mixed solvent. The critical features of the two component solvent used to prepare the casting solution are: (i) that it be able to dissolve the polymer, (ii) that one component must be low boiling (e.g., acetone) and the second component must be a relatively high boiler (e.g., dimethylacetamide or dimethylformamide), and (iii) the high boiling solvent must have a strong affinity for water (i.e., the solvent strongly hydrogen bonds with water). After thorough mixing of the polymer powder and solvent and removal of air bubbles from the casting solution, the polymer/solvent solution is heated and then is spread (cast) on a glass plate. At this point an asymmetric fluoropolymer membrane microstructure can be achieved by two distinct and separate membrane casting procedures: (1) complete air evaporation of the solvent (hereafter identified as the dry fabrication process) and (2) partial evaporation of the solvent followed by immersion in an aqueous precipitation bath (the wet casting process). In both procedures a dense polymer layer forms at the polymer/glass interface with a porous polymer structure above the dense layer (porous layer is in contact with the aqueous precipitation bath and/or air).

The choice of fluoropolymers in the casting solution is only restricted by the solubility of the polymer powder in the mixed solvent. Single polymers (such as polyvinylidene fluoride, hereafter denoted as PVDF), polymer mixtures (e.g., PVDF and polyvinylchlorotrifluoroethylene, hereafter denoted as PCTFE), or copolymers of two fluoropolymers (e.g., PVDF and polytetrafluoroethylene, hereafter denoted as PTFE) can be used to fabricate an asymmetric fluoropolymer membrane.

The asymmetric fluoropolymer membranes are to be differentiated for commercially available asymmetric reverse osmosis (RO) membranes, such as cellulose acetate membranes for removing inorganic salts from water. Asymmetric RO membranes are usually made by the Loeb-Sourirajan procedure where a fully dense layer of cellulose acetate forms (via phase-inversion) at the air/polymer film interface and the porous backing layer forms between the dense layer and the glass plate on which the membrane is cast (porous layer beneath the dense layer).

Specific examples of the membrane casting procedure follow.

I. Dry Casting Technique (with PVDF polymer)

Polymer: Commercial-grade 530,000 molecular weight polyvinylidene fluoride;
Solvent: acetone+N,N-dimethylacetamide (DMAc);
Casting Temperature and Humidity: 21°–24° C. and 50–60% relative humidity;
Casting Solution: 12 wt. % PVDF, 15 wt. % DMAc, and 73 wt. % acetone (mixture is heated to 50° C. for 1 hour prior to film casting).

Procedure

After heating, the polymer/solvent mixture is allowed to stand at room temperature until all air bubbles are removed. The polymer solution is then spread (cast) to a depth of 200–250 μm on a clean glass plate. The film is allowed to air dry for about 2–3 hours. After air drying, the membrane film (attached to the glass plate) is immersed in a 25° C. water bath for 30 minutes wherein it dislodges from the glass plate at this time. The membrane film is then put in a pure ethanol bath at 25° C. for 30 minutes to remove any residual organic solvent and is allowed to air dry at room temperature for 12 hours. A scanning electron micrograph (SEM) of the resulting membrane revealed an asymmetric microstructure, with a microporous structure at the film/air interface and a dense polymeric layer at the film/glass interface.

II. Wet Casting Procedure (with PVDF polymer)

Polymer: Commercial-grade 530,000 molecular weight polyvinylidene fluoride;
Solvent: acetone+N,N-dimethylacetamide (DMAc);
Casting Temperature and Humidity: 23°–25° C. and 45–55% relative humidity;
Casting Solution: 14 wt. % PVDF, 13 wt. % DMAc, and 73 wt. % acetone (mixture is heated to 48° C. for 0.5 hour prior to film casting).

Procedure

The polymer solution is spread on a glass plate and allowed to air dry for 12 minutes. The plate and film are then immersed in three different precipitation baths. The first bath is maintained at 15° C. and is composed of 50 vol % water, 40 vol % acetone, and 10 vol % dimethylacetamide. The membrane is immersed in this bath for 15 minutes, during which time the membrane dislodges from the glass plate. The second bath (also at 15° C.) is composed of 60 vol % water and 40 vol % acetone. The immersion time for this bath is 15 minutes. The third bath is pure water at 15° C. and the immersion time is 30 minutes. After the film is withdrawn from the last bath, it is removed from the glass plate and allowed to air dry.

Scanning electron micrographs of a cross section of the resulting membrane showed an asymmetric structure with a microporous layer at the film/air interface and a dense polymer at the membrane/glass interface (as was the case for the dry cast membrane).

The performance of the dry and wet cast asymmetric PVDF membranes also differs substantially from homogeneous (non-asymmetric) dense PVDF and homogeneous microporous PVDF films. As shown in Example No. 1, Table 4 completely microporous and dense PVDF pervaporation membranes are unable to separate benzene from water, whereas the dry and wet cast asymmetric films show large separation factors for benzene. Thus, both visual (SEM) and organic separation factor evidence exists which clearly differentiates the asymmetric PVDF membrane from PVDF films which are completely dense and completely microporous.

III. Variations in the Wet Casting Procedure for Asymmetric PVDF Films

Variations in air dry temperature and the weight ratio of PVDF to DMAc during membrane casting have some effect on organic and water transport through the membrane but do not alter the asymmetric structure nor the fundamental separation characteristics of the film. This is shown by the benzene/water separation data in Tables 1 and 2, where the air dry temperature was varied from 20° C.–45° C. (for an air humidity of 65%) and the PVDF/DMAc wt. ratio was varied from 12 wt %/15 wt % to 16 wt %/11 wt % (for an air dry temperature of 25° C. and an air humidity of 50%). Table 3 shows the effect of air humidity during the film drying step on PVDF membrane performance. When the air humidity was varied from 45% to 85%, for an air temperature of 25° C., high separation factors for a benzene/water feed were observed.

TABLE 1

Effect of Air Dry Temperature on Wet Cast Asymmetric PVDF Membrane Performance
Casting Solution: 14 wt % PVDF, 13 wt % DMAc, and 73% acetone
Air humidity: 65%
Benzene/Water Separation with a feed temperature of 25° C.
Downstream Permeate Pressure: 0.05 atm

| Air dry temperature (°C.) | Concentration of Benzene (%) | | Permeate Flux $(g/m^2\text{-hr})$ | | Benzene Separation Factor |
|---|---|---|---|---|---|
|  | Feed | Permeate | Water | Benzene |  |
| 20 | 0.0126 | 11.17 | 76.1 | 9.60 | 998 |
| 25 | 0.0119 | 9.10 | 97.0 | 9.70 | 841 |
| 35 | 0.0119 | 6.10 | 150 | 9.70 | 546 |
| 45 | 0.0130 | 2.70 | 316 | 8.80 | 213 |

TABLE 2

Effect of PVDF/DMAc Casting Composition on Wet Cast Asymmetric PVDF Membrane Performance
Air Dry Temperature: 25° C.
Air humidity: 50%
Benzene/Water Separation with a feed temperature of 25° C.
Downstream Permeate Pressure: 0.05 atm
73% Acetone in all Casting Solutions

| PVDF/DMAc Casting Solution Composition (wt %/wt %) | Concentration of Benzene (%) | | Permeate Flux $(g/m^2\text{-hr})$ | | Benzene Separation Factor |
|---|---|---|---|---|---|
|  | Feed | Permeate | Water | Benzene |  |
| 12/15 | 0.0128 | 16.1 | 54.9 | 10.5 | 1,499 |
| 13/14 | 0.0140 | 18.5 | 43.4 | 9.90 | 1,621 |
| 14/13 | 0.0135 | 23.0 | 34.6 | 10.4 | 2,213 |
| 16/11 | 0.0137 | 33.8 | 14.7 | 7.50 | 3,727 |

TABLE 3

Effect of Air Humidity on Wet Cast Asymmetric PVDF Membrane Performance
Casting Solution: 14 wt % PVDF, 13 wt % DMAc, and 73% acetone
Air Temperature: 25° C.
Benzene/Water Separation with a feed temperature of 25° C.
Downstream Permeate Pressure: 0.05 atm

| Air Humidity | Concentration of Benzene (%) | | Permeate Flux $(g/m^2\text{-hr})$ | | Benzene Separation Factor |
|---|---|---|---|---|---|
|  | Feed | Permeate | Water | Benzene |  |
| 45% | 0.0114 | 27.1 | 24.3 | 9.00 | 3,261 |
| 55% | 0.0118 | 16.6 | 44.8 | 8.80 | 1,687 |
| 65% | 0.0119 | 9.08 | 97 | 9.70 | 839 |
| 75% | 0.0099 | 6.22 | 136 | 9.00 | 670 |
| 85% | 0.0118 | 4.79 | 183 | 9.20 | 426 |

IV. Dry Casting Procedure with PVDF/PTFE Copolymer

This asymmetric pervaporation membrane was made using a polyvinylidene fluoride (PVDF)/polytetrafluoroethylene (PTFE) co-polymer. This polymer is sold commercially by Atochem North America, Inc. under the trademark KYNAR 7201. To fabricate a membrane, the following polymer/solvent mixture was prepared: 14 wt % polymer + 13 wt % Dimethylformamide + 73% acetone. The solution was heated between about 0.5–1.0 hours at 45° C., then allowed to cool to room temperature and stand for two days. A polymer film was cast on a flat glass plate and the solvent was allowed to evaporate for 1.5 hours at room air conditions (22°–25° C. and 45–55% humidity). The membrane was then washed thoroughly with distilled water and dried. Scanning electron micrographs of a membrane cross section showed an asymmetric polymer microstructure, with a dense-like layer at the film/glass interface and a microporous region at the film/air surface. The performance of this membrane for benzene/water separation is demonstrated in Example 8.

V. Wet Cast Procedure with PVDF/PHFP Copolymer

Asymmetric pervaporation membranes were made from a commercially available copolymer of polyvinylidene fluoride (PVDF) and polyhexafluoropropylene (PHFP). This polymer is sold by Atochem North America, Inc. under the trade name Kynar 2801. The PVDF/PHFP polymer was mixed with two solvents, dimethylacetamide (DMAc) and acetone, to produce the polymer casting solutions. Two polymer/solvent formulations were examined: 12 wt % PVDF/PHFP polymer + 12 wt % DMAc + 76 wt % acetone and 12 wt % PVDF/PHFP + 24 wt % DMAc + 64 wt % acetone. The same casting procedure was used for both casting solutions. First, the polymer/solvent solution was heated and maintained at 45° C. for between about 0.5–1.0 hours. The solution was then allowed to stand at room temperature for 2 days. After casting a thin film of the mixture on a clean glass plate, solvent was allowed to evaporate for 10 minutes at 25° C. air with a relative humidity of 60%. The glass plate and film were then transferred to a 25° C. precipitation bath composed of 25 volume % acetone and 75 vol % water. The membrane was kept in this bath for 25 minutes, then immersed in a 25° C. pure water bath for another 30 minutes. The membrane was then allowed to air dry. A scanning electron micrograph of the membrane cross section showed an asymmetric structure, not unlike that seen with the other fluoropolymers described above. The performance of pervaporation membranes made from the two polymer/solvent solutions is quantified in Example 8 for benzene/water separation.

VI. Wet Casting Procedure (with a polymer mixture of PVDF and PVDF/PCTFE copolymer)

An asymmetric membrane has been fabricated using a polymer mixture of PVDF and a copolymer of polyvinylidene fluoride and polyvinylchlorotrifluoroethylene (hereafter abbreviated by PCTFE). The casting solution was composed of 9.8 wt % PVDF, 4.2 wt %

PVDF/PCTFE copolymer, 13 wt % dimethylacetamide, and 73 wt % acetone. The PVDF/PCTFE copolymer was purchased from 3M Corp. and is sold under the trademark KF-3700. The polymer solution was heated for 1 hour at about 48° C., then allowed to stand and cool. The polymer solution was spread on a clean glass plate and the resulting film was allowed to air dry for 9 minutes (air conditions: 25° C. and 50% relative humidity). The film and plate were immersed for 15 minutes in a 15° C. precipitation bath composed of 40% acetone, 50% water and 10% dimethylacetamide. The membrane was then immersed in a second bath (40% acetone and 60% water at ! 5° C.) for 15 minutes, followed by thorough washing in distilled water. The performance of this membrane for benzene/water separation is demonstrated in Example 9.

EXAMPLES OF MEMBRANE PERFORMANCE

Example 1

Comparison of Flux and Separation Factor Data for Asymmetric, Fully (Symmetric) Dense, and Fully (Symmetric) Microporous PVDF Membranes For a fully dense PVDF membrane, the polymer/solvent solution consists of 14 wt. % PVDF, 30 wt. % DMAc, and 56 wt. % acetone (significantly more DMAc and less acetone in the casting solution). This solution is not heated prior to casting. After casting, the membrane is air dried for 2 hours at room temperature. The remaining steps of the casting procedure are the same as that for the asymmetric case as set forth in Example I. A SEM of the membrane at a magnification factor between 1000–2000× showed a fully dense membrane (non-asymmetric) structure.

For a symmetric PVDF membrane with a fully microporous structure, the following polymer/casting solution was used: 15 wt. % PVDF, 35 wt. % DMAc, and 50 wt. % acetone. The casting solution was heated to 60° C. for 1 hour. After casting, the polymer film was allowed to air dry for 2 hours. The remaining steps of the casting procedure are identical to the dry casting technique utilized to produce the asymmetric membrane of Example I. The SEM microstructure of the membrane was microporous and clearly distinguishable from an asymmetric membrane.

For comparison purposes, the performance of asymmetric (wet and dry casting), symmetric fully dense, and symmetric fully microporous PVDF were examined for a feed solution of approximately 100 ppm benzene in water. A standard flat sheet membrane pervaporation apparatus was used in this and all other examples given below. The apparatus contained two flat sheeting PV cells which were operated in parallel. Fluxes through the membrane were generated by applying a vacuum to the permeate side of the membrane. Benzene/water permeate was collected in a liquid nitrogen cold trap over a period of 15 minutes after allowing the system to stabilize for at least 1 hour at a predetermined downstream pressure. The trapped permeate was weighed, then mixed with 20 grams of acetone to fully solubilize both the water and benzene. The resulting solution was then analyzed for benzene using gas chromatography. From the GC and weighing data, the flux of water and benzene through the membrane and the permeate concentrations of water and benzene were determined. The results of these experiments are given in Table 4, where each data entry represents the average flux and separation factor from two permeation experiments.

TABLE 4

Comparison of Symmetric Dense, Symmetric Microporous, and Asymmetric PVDF Membranes
Separation of Benzene from Water
Operating Temperature = 25° C.
Downstream Pressure = 0.05 atm.

| Membrane Morphology | Concentration of Benzene (%) | | Permeate Flux $(g/m^2\text{-}hr)$ | | Benzene Separation Factor |
|---|---|---|---|---|---|
| | Feed | Permeate | Water | Benzene | |
| Symmetric, Dense | 0.0119 | 0.000 | 2.5 | 0.0 | — |
| Symmetric, Microporous | 0.0107 | 0.0146 | 2,103 | 0.3 | 1.4 |
| Asymmetric, Dry Cast | 0.0124 | 13.2 | 59.1 | 8.96 | 1,226 |
| Asymmetric, Wet Cast | 0.0125 | 31.40 | 36.6 | 16.8 | 3,662 |

The results in Table 4 show that no benzene and only a small amount of water can pass through a symmetric dense PVDF membrane. Since the separation factor for the symmetric microporous PVDF membrane is approximately 1.0, benzene and water penetrate through the membrane in the same proportion as their concentration in the feed solution and the membrane exhibits no permselectivity. Both the dry and wet cast asymmetric PVDF membranes exhibit a high benzene selectivity, i.e., the magnitude of the benzene flux as compared to that of water is much greater than the benzene-to-water concentration in the feed solution.

Example 2

Separation of Nonpolar Aromatic Hydrocarbons from Water Using Wet and Dry Cast Asymmetric PVDF This example is intended to show that an asymmetric PVDF pervaporation membrane can be used to concentrate nonpolar aromatic hydrocarbons (benzene and toluene) from water. Membrane performance is quantified in terms of the separation factor and organic and water fluxes. Data for benzene/water separation using dry and wet cast asymmetric PVDF membranes are listed in Tables 5 and 6, respectively. Flux and separation factor data for toluene/water feed solutions using dry and wet east asymmetric PVDF are given in Tables 7 and 8, respectively.

In the tables given in this example, the ratio of the aromatic hydrocarbon to water flux is much greater than the organic/water concentration ratio in the feed solution, indicating preferential (permselective) transportation of the organic across the PVDF membrane.

TABLE 5

The Separation of Benzene from Water
with a Dry Cast
Asymmetric PVDF Membrane
Operating Temperature = 25° C.
Downstream Pressure = 0.05 atm.

| Concentration of Benzene (%) | | Permeate Flux $(g/m^2\text{-}hr)$ | | Benzene Separation Factor |
|---|---|---|---|---|
| Feed | Permeate | Water | Benzene | |
| 0.0010 | 2.66 | 42.3 | 1.16 | 2,733 |
| 0.0031 | 5.92 | 47.0 | 2.96 | 2,030 |
| 0.0124 | 13.2 | 59.1 | 8.96 | 1,226 |
| 0.0282 | 23.5 | 62.3 | 19.1 | 1,089 |
| 0.0448 | 31.1 | 69.7 | 31.5 | 1,008 |
| 0.0904 | 43.7 | 69.4 | 53.9 | 859 |

TABLE 6

The Separation of Benzene from Water
with a Wet Cast
Asymmetric PVDF Membrane
Operating Temperature = 25° C.
Downstream Pressure = 0.05 atm.

| Concentration of Benzene (%) | | Permeate Flux (g/m²-hr) | | Benzene Separation Factor |
|---|---|---|---|---|
| Feed | Permeate | Water | Benzene | |
| 0.0102 | 28.2 | 31.9 | 12.5 | 3,851 |
| 0.0125 | 31.4 | 36.6 | 16.8 | 3,662 |
| 0.0354 | 43.8 | 49.9 | 39.0 | 2,201 |
| 0.0623 | 50.6 | 72.5 | 74.1 | 1,644 |
| 0.0889 | 57.6 | 77.3 | 104.9 | 1,528 |

TABLE 7

The Separation of Toluene from Water
with a Dry Cast
Asymmetric PVDF Membrane
Operating Temperature = 25° C.
Downstream Pressure = 0.05 atm.

| Concentration of Toluene (%) | | Permeate Flux (g/m²-hr) | | Toluene Separation Factor |
|---|---|---|---|---|
| Feed | Permeate | Water | Toluene | |
| 0.0013 | 1.45 | 90.5 | 1.33 | 1,132 |
| 0.0042 | 2.68 | 93.1 | 2.56 | 656 |
| 0.0073 | 3.31 | 99.4 | 3.40 | 469 |
| 0.0158 | 5.41 | 108 | 6.17 | 362 |
| 0.0199 | 6.92 | 114 | 8.45 | 374 |
| 0.0374 | 11.7 | 126 | 16.72 | 354 |

TABLE 8

The Separation of Toluene from Water
with a Wet Cast
Asymmetric PVDF Membrane
Operating Temperature = 25° C.
Downstream Pressure = 0.05 atm.

| Concentration of Toluene (%) | | Permeate Flux (g/m²-hr) | | Toluene Separation Factor |
|---|---|---|---|---|
| Feed | Permeate | Water | Toluene | |
| 0.0021 | 17.2 | 51.6 | 10.7 | 9,892 |
| 0.0103 | 23.8 | 61.0 | 19.0 | 3,032 |
| 0.0219 | 34.6 | 75.6 | 39.9 | 2,416 |
| 0.0435 | 44.3 | 89.1 | 70.9 | 1,828 |

Example 3

Separation of Chlorinated Hydrocarbons from Water Using Asymmetric Wet and Dry Cast PVDF In this example, asymmetric PVDF pervaporation membranes are used to selectively removed a model chlorinated hydrocarbon (chloroform) from water. Table 9 lists flux and separation factor data for a dry cast membrane, while Table 10 gives the membrane performance for wet cast PVDF.

TABLE 9

The Separation of Chloroform from Water
with a Dry Cast
Asymmetric PVDF Membrane
Operating Temperature = 25° C.
Downstream Pressure = 0.05 atm.

| Concentration of Chloroform (%) | | Permeate Flux (g/m²-hr) | | Chloroform Separation Factor |
|---|---|---|---|---|
| Feed | Permeate | Water | Chloroform | |
| 0.0023 | 1.28 | 109 | 1.41 | 564 |
| 0.0059 | 2.79 | 113 | 3.23 | 486 |
| 0.0133 | 4.31 | 116 | 5.21 | 339 |
| 0.0425 | 12.0 | 126 | 17.2 | 321 |
| 0.1341 | 26.7 | 137 | 49.9 | 271 |
| 0.1504 | 28.7 | 153 | 61.8 | 267 |

TABLE 10

The Separation of Chloroform from Water
with a Wet Cast
Asymmetric PVDF Membrane
Operating Temperature = 25° C.
Downstream Pressure = 0.05 atm.

| Concentration of Chloroform (%) | | Permeate Flux (g/m²-hr) | | Chloroform Separation Factor |
|---|---|---|---|---|
| Feed | Permeate | Water | Chloroform | |
| 0.0623 | 33.9 | 115 | 58.7 | 823 |
| 0.1292 | 47.9 | 125 | 115 | 711 |
| 0.2152 | 57.3 | 142 | 191 | 622 |

Example 4

Separation of Alcohol from Water Using Asymmetric Dry Cast PVDF

This example is intended to demonstrate that an asymmetric PVDF membrane (dry cast) can be used to concentrate alcohol from an alcohol/water feed stream containing between 0.0089% and 0.3459% alcohol. In this example, the alcohol is n-butanol. Experimental butanol separation factors and butanol and water fluxes are listed in Table 11. Separation factors greater than 1.0 indicate that n-butanol is being concentrated in the permeate stream.

TABLE 11

The Separation of n-Butanol from Water
with a Dry Cast
Asymmetric PVDF Membrane
Operating Temperature = 25° C.
Downstream Pressure = 0.05 atm.

| Concentration of n-butanol (%) | | Permeate Flux (g/m²-hr) | | n-butanol Separation Factor |
|---|---|---|---|---|
| Feed | Permeate | Water | n-butanol | |
| 0.0089 | 0.18 | 90.8 | 0.16 | 19.7 |
| 0.0181 | 0.25 | 93.1 | 0.23 | 13.8 |
| 0.0376 | 0.45 | 96.5 | 0.44 | 12.0 |
| 0.1101 | 1.28 | 98.3 | 1.27 | 11.8 |
| 0.2602 | 2.03 | 102 | 2.12 | 7.96 |
| 0.3459 | 2.67 | 106 | 2.92 | 7.93 |

Example 5

Separation of Dioxane from Water Using Asymmetric Wet Cast PVDF

This example is intended to show that an asymmetric wet cast PVDF membrane can be used in a pervaporation separation scheme to remove a water soluble organic (1,4-dioxane) from water. As can be seen from the data in Table 12, the dioxane separation is greater than 1 for feed solutions containing up to 27.3% dioxane.

TABLE 12

The Separation of 1,4-dioxane from Water
with a Wet Cast
Asymmetric PVDF Membrane
Operating Temperature = 25° C.
Downstream Pressure = 0.05 atm.

| Concentration of dioxane (%) | | Permeate Flux (g/m²-hr) | | Dioxane Separation Factor |
|---|---|---|---|---|
| Feed | Permeate | Water | dioxane | |
| 0.39 | 5.91 | 78.4 | 4.93 | 16.0 |
| 1.52 | 10.9 | 88.0 | 10.8 | 7.93 |
| 6.86 | 29.7 | 93.7 | 39.7 | 5.74 |

TABLE 12-continued

| | | | | |
|---|---|---|---|---|
| 10.3 | 36.0 | 133 | 74.7 | 4.89 |
| 20.3 | 45.5 | 145 | 121 | 3.28 |
| 27.3 | 48.9 | 156 | 149 | 2.55 |

Example 6
Separation of Ethyl Acetate from Water Using an Asymmetric Wet Cast PVDF Membrane This example shows that an asymmetric PVDF membrane, when used in a pervaporation apparatus, can selectively remove ethyl acetate (a water soluble organic) from water. The ethyl acetate separation factor increases from 18.4 to 47.0 as the ethyl acetate feed content decreases from 4.23% to 0.65%. When the feed concentration falls below 0.65%, the separation factor for ethyl acetate drops below 47.0.

TABLE 13

The Separation of Ethyl Acetate from Water
with a Dry Cast
Asymmetric PVDF Membrane
Operating Temperature = 25° C.
Downstream Pressure = 0.05 atm.

| Concentration of ethyl acetate (%) | | Permeate Flux ($g/m^2$-hr) | | ethyl acetate Separation Factor |
|---|---|---|---|---|
| Feed | Permeate | Water | ethyl acetate | |
| 0.07 | 2.39 | 85.4 | 2.09 | 35.0 |
| 0.28 | 10.6 | 103 | 12.2 | 42.2 |
| 0.65 | 23.5 | 113 | 34.5 | 47.0 |
| 1.52 | 36.3 | 125 | 71.2 | 36.9 |
| 2.87 | 42.5 | 150 | 111 | 25.0 |
| 4.23 | 44.8 | 172 | 139 | 18.4 |

Example 7
Separation of Acetone from Water Using an Asymmetric Wet Cast PVDF Membrane This example shows that an asymmetric PVDF membrane can be used to selectively remove acetone from water in a pervaporation separation scheme. Although acetone (at high concentrations) was used to cast the membrane (i.e., to assist in solubilizing PVDF), the membrane is chemically stable to acetone at low concentrations.

TABLE 14

The Separation of Acetone from Water
with a Wet Cast
Asymmetric PVDF Membrane
Operating Temperature = 25° C.
Downstream Pressure = 0.05 atm.

| Concentration of acetone (%) | | Permeate Flux ($g/m^2$-hr) | | acetone Separation Factor |
|---|---|---|---|---|
| Feed | Permeate | Water | acetone | |
| 0.14 | 2.84 | 95 | 2.78 | 20.9 |
| 0.19 | 5.66 | 101 | 6.04 | 31.5 |
| 0.59 | 17.1 | 117 | 24.1 | 35.0 |
| 0.68 | 19.8 | 121 | 29.7 | 36.1 |
| 2.24 | 33.8 | 166 | 84.8 | 22.3 |
| 4.30 | 38.2 | 244 | 151 | 13.8 |

Example 8
Separation of Benzene from Water Using Asymmetric Wet and Dry Cast Membranes Composed of PVDF/Polyhexafluoropropylene or PVDF/Polytetrafluoroethylene Copolymer This example is intended to show that pervaporation membranes composed of fluoropolymer copolymers are effective in separating benzene from water. Two membranes were examined, one containing a PVDF//Polyhexafluoropropylene (PHFP) copolymer and the other membrane composed of PVDF and polytetrafluoroethylene (PTFE). Both membranes worked well, with high benzene separation factors.

TABLE 15

The Separation of Benzene from Water Using Wet and Dry Cast
PVDF/PHFP and PVDF/PTFE Asymmetric Membranes
Operating Temperature = 25° C.
Downstream Pressure = 0.01 atm.

| Membrane Polymer (casting procedure) | Concentration of Benzene (%) | | Permeate Flux ($g/m^2$-hr) | | Benzene Separation Factor |
|---|---|---|---|---|---|
| | Feed | Permeate | Water | Benzene | |
| PVDF/PTFE (dry cast) | 0.0115 | 3.26 | 52.2 | 1.8 | 293 |
| PVDF/PHFP[1] (wet cast) | 0.0100 | 4.37 | 102 | 4.67 | 456 |
| PVDF/PHFP[2] (wet cast) | 0.00930 | 3.84 | 166 | 6.65 | 430 |

[1]Membrane casting solution composed of 12% polymer + 12% DMAc + 76% acetone
[2]Membrane casting solution composed of 12% polymer + 24% DMAc + 64% acetone

Example 9
Separation of Benzene from Water Using an Asymmetric Wet Cast Membrane Composed of a Mixture of PVDF and PVDF/PCTFE Copolymer This example is intended to show that pervaporation membranes comprised of a mixture of fluoropolymers are effective in separating benzene from water. The membrane examined here was composed of a mixture of PVDF and PVDF/polyvinylchlorotrifluoroethylene. The membrane worked well for feed solutions in the temperature range of 25° C.–60° C., with high benzene separation factors and reasonably high benzene fluxes.

TABLE 16

The Separation of Benzene from Water Using Wet Cast
Asymmetric Membranes Composed of
a Mixture of PVDF and PVDF/PCTFE
Operating Temperature = 25° C.
Downstream Pressure = 0.05 atm.
Feed Concentration 100 ppm benzene in water

| Feed Temperature (°C.) | Permeate Flux ($g/m^2$-hr) | | Benzene Separation Factor |
|---|---|---|---|
| | Water | Benzene | |
| 25 | 26.8 | 9.36 | 2,733 |
| 45 | 163 | 13.8 | 817 |
| 60 | 496 | 20.6 | 427 |

Example 10
Organic/Organic Separations Using an Asymmetric Wet Cast PVDF Membrane This example is intended to show that an asymmetric PVDF pervaporation membrane can be used to carry out organic/organic separations. The feed solution contained either a mixture of benzene and cyclohexane or toluene and ethanol. In both experiments a wet cast asymmetric PVDF membrane was used. The aromatic hydrocarbon component of the feed was selectively transported across the membrane and its concentration in the permeate is higher than that in the feed (i.e., the benzene or toluene separation factor is greater than 1.0).

TABLE 17

Benzene/Cyclohexane and Toluene/Ethanol
Separations Using Wet Cast
Asymmetric PVDF Membranes
Operating Temperature = 25° C.
Downstream Pressure = 0.1 atm.

| Feed Composition | Permeate Concentration | Permeate Flux (g/m²-hr) | Separation Factor |
|---|---|---|---|
| 2 wt % benzene in cyclohexane | 4.6% benzene | 11.0 Benzene 229 cyclohexane | 2.4 (for benzene) |
| 2 wt % toluene in ethanol | 6.1% toluene | 15.9 Toluene 245 ethanol | 3.2 (for toluene) |

Although the present process has been described with reference to specific details of certain embodiments thereof, it is not intended that such details should be regarded as limitations upon the scope of the invention except as and to the extent that they are included in the accompanying claims.

As used in the claims, "a" means one or more.

What is claimed is:

1. A method for fabricating an asymmetric fluoropolymer membrane comprised of a fluoropolymer material, the membrane having a first surface comprised of a dense layer of the fluoropolymer material, and an opposite second surface comprised of a porous layer of the fluoropolymer material, comprising the steps of:
   (a) dissolving a fluoropolymer material in a solvent mixture comprised of a low boiling point solvent and a high boiling point solvent to form a solution;
   (b) depositing the solution on a casting surface; and
   (c) removing the solvent mixture from the solution, thereby precipitating the asymmetric fluoropolymer membrane therefrom such that the first surface of the membrane precipitates at the interface of the casting surface and the solution.

2. The method of claim 1, further comprising the step of heating the solution at a temperature of between about 45°-60° C. for between about 30-60 minutes prior to depositing the solution on the casting surface.

3. The method of claim 1, wherein the removing step comprises evaporating the solvent from the solution by air drying the solution.

4. The method of claim 1, wherein the removing step further comprises the steps of:
   (a) evaporating the solvent by air drying the solution for a sufficient period of time until the surface of the solution at the air interface has gelled; and
   (b) immersing the solution in a precipitation bath.

5. The method of claim 1, wherein the fluoropolymer material is selected from the group consisting of a fluoropolymer, a fluorinated copolymer, and mixtures thereof.

6. The method of claim 5, wherein the fluoropolymer material is selected from the group consisting of polyvinylidene fluoride, polytetrafluoroethylene, polyhexafluoropropylene, and polyvinylchlorotrifluoroethylene.

7. The method of claim 1, wherein the low boiling point solvent boils at between about 40°-60° C. and the high boiling solvent boils at between about 140°-200° C.

8. The method of claim 1, wherein the high boiling point solvent has a strong affinity for water.

9. The method of claim 1, wherein the low boiling point solvent is acetone and the high boiling point solvent is selected from the group consisting of dimethylacetamide, dimethylformamide, dimethylsulfoxide and mixtures thereof.

10. The method of claim 1, wherein the mixture of solvents comprises between about 75-90 vol % acetone and between about 10-25 vol % of a high boiling point solvent selected from the group consisting of dimethylacetamide, dimethylformamide, dimethylsulfoxide and mixtures thereof.

11. The method of claim 1, wherein the casting surface comprises a suitable inert support surface.

12. The method of claim 11, wherein the casting surface is selected from the group consisting of glass, metal, plastic, paper, and non-woven fabric.

13. The method of claim 1, wherein the solution comprises between about 10-16 wt % polyvinylidene fluoride, between about 65-75 wt % acetone and between about 10-25 wt % of a high boiling point solvent selected from the group consisting of dimethylformamide, dimethylacetamide, dimethylsulfoxide and mixtures thereof.

14. The method of claim 3, wherein the solution comprises about 12 wt % polyvinylidene fluoride, about 73 wt % acetone, and about 15 wt % of a high boiling point solvent selected from the group consisting of dimethylformamide, dimethylacetamide, dimethylsulfoxide and mixtures thereof.

15. The method of claim 4, wherein the solution comprises about 14 wt % polyvinylidene fluoride, about 73 wt % acetone and about 13 wt % of a high boiling point solvent selected from the group consisting of dimethylformamide, dimethylacetamide, dimethylsulfoxide and mixtures thereof.

16. The method of claim 1, wherein the solution comprises between about 10-16 wt % polyvinylidene fluoride/polytetrafluoroethylene copolymer, between about 60-80 wt % acetone and between about 10-25 wt % of a high boiling point solvent selected from the group consisting of dimethylformamide, dimethylacetamide, dimethylsulfoxide and mixtures thereof.

17. The method of claim 1, wherein the solution comprises about 12 wt % polyvinylidene fluoride/polyhexafluoropropylene copolymer, about 76 wt % acetone and about 12 wt % of a high boiling point solvent selected from the group consisting of dimethylformamide, dimethylacetamide, dimethylsulfoxide and mixtures thereof.

18. The method of claim 1, wherein the solution comprises about 12 wt % polyvinylidene fluoride/polyhexafluoropropylene copolymer about 64 wt % acetone, and about 24 wt % of a high boiling point solvent selected from the group consisting of dimethylformamide, dimethylacetamide, dimethylsulfoxide and mixtures thereof.

19. The method of claim 1, wherein the solution comprises between about 8-12 wt % polyvinylidene fluoride, between about 2-6 wt % polyvinylidene fluoride/polyvinylchlorotrifluoroethylene copolymer between about 65-75 wt % acetone, and between about 10-25 wt % of a high boiling point solvent selected from the group consisting of dimethylformamide, dimethylacetamide, dimethylsulfoxide and mixtures thereof.

20. The method of claim 19, wherein the solution comprises about 9.8 wt % polyvinylidene fluoride, about 4.2 wt % polyvinylidene fluoride/polyvinylchlorotrifluoroethylene copolymer about 73 wt % acetone, and about 13 wt % of a high boiling point solvent selected from the group consisting of dimethylformamide, dimethylacetamide, dimethylsulfoxide and mixtures thereof.

21. The method of claim 1, and further comprising prior to the removing step the step of controlling air temperature and humidity wherein the air temperature is between about 20°–45° C. and the humidity is between about 45–85%.

22. The method of claim 3, wherein the solution is air dried for between about 0.5–3.0 hours.

23. The method of claim 4, wherein the solution is air dried for between about 1–30 minutes.

24. The method of claim 4, wherein the precipitation bath comprises a liquid selected from the group consisting of water, acetone, dimethylacetamide, dimethylformamide, dimethylsulfoxide, and mixtures thereof.

25. The method of claim 4, wherein the precipitation bath, comprises three baths: a first precipitation bath comprising about 50–60 vol % water, about 35–45 vol % acetone, and about 5–15 vol % of a solvent selected from the group consisting of dimethylformamide, dimethylacetamide, dimethylsulfoxide and mixtures thereof; a second precipitation bath comprising about 55–75 vol % water and about 25–45 vol % acetone; and a third precipitation bath comprising water and wherein the immersing step comprises placing the solution successively in the first, second and third baths.

26. The method of claim 4, wherein the precipitation bath comprises two baths: a first precipitation bath comprising about 25 vol % acetone and about 75 vol % water and a second precipitation bath consisting of water and wherein the immersing step comprises placing the solution successively in the first and second baths.

27. The method of claim 4, wherein the temperature of the precipitation baths is between about 0°–25° C.

28. The method of claim 4, wherein the temperature of the precipitation baths is preferably about 15° C.

* * * * *